United States Patent Office 3,230,262
Patented Jan. 18, 1966

3,230,262
PROCESS FOR THE PRODUCTION OF BORON HETEROCYCLES
Roland Köster, Mulheim (Ruhr), Germany, assignor to Studiengesellschaft Kohle m.b.H., a corporation of Germany
No Drawing. Filed Mar. 18, 1960, Ser. No. 15,809
Claims priority, application Germany, Mar. 21, 1959, St 14,916
14 Claims. (Cl. 260—606.5)

This invention relates to a process for the production of boron heterocycles.

Cyclic aromatic boron carbon compounds are scarcely known. Up to the present, the only method of production known has been by reaction of an organometallic compound (especially lithium compound) with a boron halide or an ortho-boric acid ester according to the general equation (see Journal American Chemical Society, vol. 77, 5176 (1955), and Chemische Berichte, vol. 88, 962 (1955)):

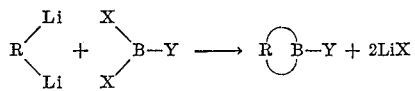

wherein R is an aromatic hydrocarbon radical, X and Y are fluorine or OR' (R'=hydrocarbon radical).

In addition to the use of boron halogen compounds, these methods require the use of metal aryls, which in part are difficult to prepare and consequently expensive. The yields of boron heterocycles are not satisfactory.

It has been found that hitherto unknown cyclic boron hydrocarbons can be produced by a very simple method and in a quantitative yield. The process of the invention does not require the use of auxiliary materials such as halogen compounds or organometallic compounds.

It is an object of the present invention to provide a process for the production of cyclic aromatic boron hydrocarbons which comprises heating boron compounds of the general formula $BR_2R'$ wherein R is a member selected from the group consisting of hydrogen, aliphatic, cyclo-aliphatic and aryl-substituted aliphatic hydrocarbon radicals and R' is an aryl-substituted alkyl radical, to a temperature in excess of 150° C. with hydrogen and hydrocarbon being split off during said heating. The process of the invention is preferably carried out at a temperature in the range between 180° and 350° C.

Under the reaction conditions mentioned above, the formation of the cyclic boron hydrocarbons may take place by various routes. Thus, for example, cyclic boron heterocycles are obtained from boron hydrocarbons of the general formula $B(R_a)_3$ (wherein $R_a$ is an aliphatic, cyclo-aliphatic or aryl-substituted aliphatic radical) or from partially hydrogenated boron hydrocarbons of the general formula $B_2H_n(R_a)_{6-n}$ (wherein $R_a$ is as mentioned above) when heating the same with aryl-substituted olefins of the general formula $Ar-C_n(R_c)_{2n-1}$ or $$(R_c)_{2n-1}C_n-Ar-C_n(R_c)_{2n-1}$$

wherein Ar is an aromatic hydrocarbon radical and $R_c$ is hydrogen or a hydrocarbon radical, to temperatures of 150° C. and more preferably to 180–350° C. with substitution of the boron at the aromatic hydrocarbon radical taking place during said heating.

For example:

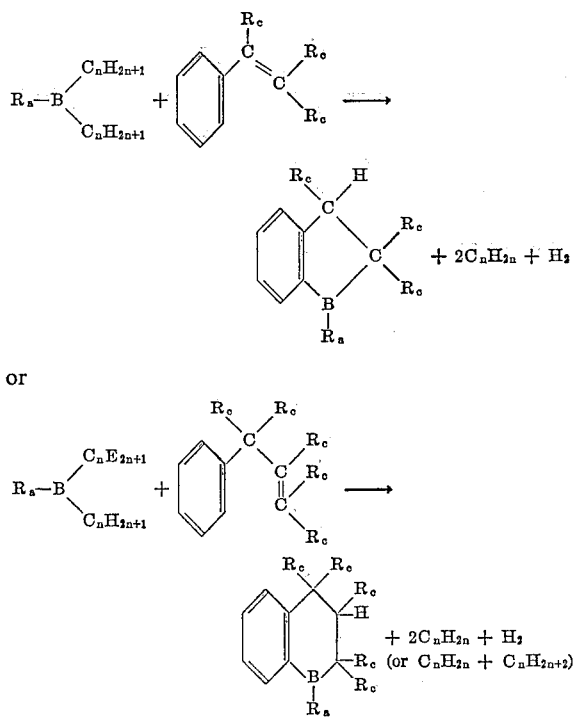

$R_a$=hydrocarbon radical
$R_c$=hydrogen or a hydrocarbon radical
$C_nH_{2n+1}$ applies to $n=0$ or an integer.

The boron atom is generally linked in the aryl nucleus in ortho position to an already existing substituent, which results in the formation of boron heterocycles having preferably 4 and 5 carbon atoms in the ring (five- and six-membered rings).

For example:

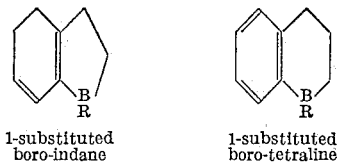

1-substituted  boro-indane    1-substituted  boro-tetraline

Several examples of the various routes leading to the ring closure reaction with formation of cyclic boron hydrocarbons are illustrated hereafter in detail.

(1) A boron trialkyl or cycloalkyl $BR_3$ is heated with an aryl-substituted olefin $Ar-C_n(R_c)_{2n-1}$ in a molar ratio of 1:1 (slight excess of $BR_3$) to 120–200° C. First, an alkyl radical R is split off as olefin (displacement reaction). By subsequent increase in temperature, hydrogen is set free in addition to another mol of olefin and ring closure takes place at the same time. For example:

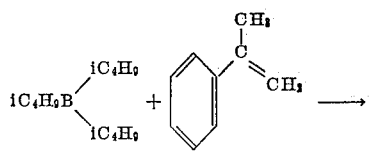

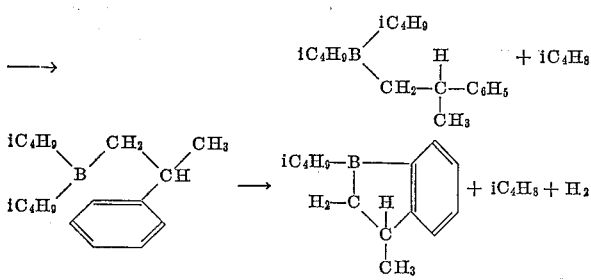

(2) A boron trialkyl BR₃ is reacted with an aryl-substituted olefin Ar—C$_n$(R$_c$)$_{2n-1}$ in a molar ratio of 1:3 by a known process (German Patent 1,034,176). Following this, the ring closure reaction is effected under a reduced pressure at a temperature between 180° and 350° C. (reaction in accordance with the invention), in which 1 mol of the initially charged aryl-substituted olefin is recovered in addition to hydrogen. For example:

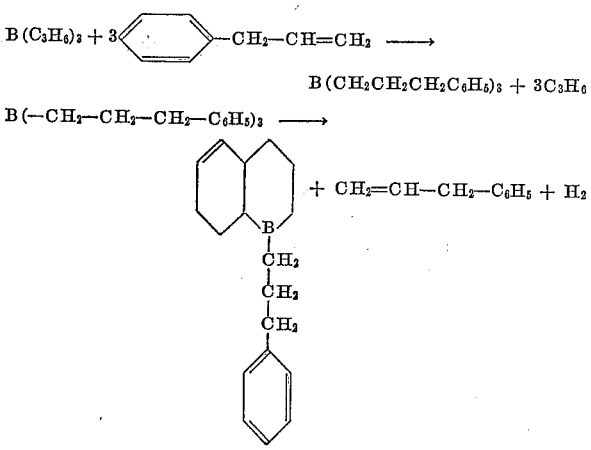

(3) A boron trialkaryl (aryl-substituted boron trialkyl) and a boron trialkyl in a 1:2 molar ratio are reacted at a temperature of between 100° and 200° C. and then the reaction in accordance with the invention is effected with the resultant mixed boron dialkyl monoalkaryl. For example:

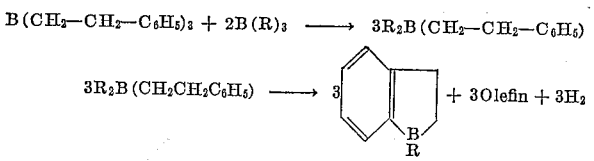

It is to be understood that still further embodiments are possible for the process of the invention. In these cases, the ring closure is always successfully achieved under similar conditions at the temperatures mentioned above. If the hydrogen and hydrocarbon split off in the ring closure reaction do not leave the reaction mixture spontaneously, care must be taken that the olefin split off together with the hydrogen (or resultant alkane or aryl-substituted alkane) is removed from the reaction mixture at temperatures of 180° to 350° C. This may, as already mentioned, be achieved by effecting the ring closure reaction under a reduced pressure.

Solvents are normally unnecessary since both the starting materials and the cyclic boron compounds which are formed are generally liquid at the temperatures required for the process of the invention.

The boron heterocycles are useful as motor fuel additives or for the production of alkylaryl-substituted boric acids or boron hydrides. They are of outstanding usefulness as additives of heating bath liquids due to their low vapor pressure (high boiling point) and their extremely high thermal stability. The products are effective as antioxidants and thereby prevent thermal degradation of the heating bath liquids by oxygen or air.

EXAMPLE 1

*1-isobutyl-3-methyl-boro-indane (from boron tri-isobutyl and α-methyl styrene)*

To 124 grams (0.68 mol) of boiling boron tri-isobutyl (B.P. 188° C.) are added dropwise within three hours 81 grams (0.68 mol) of α-methyl styrene. In doing so, the temperature of the boiling mixture rises to 200–210° C. with vigorous evolution of gas (15.1 liters (based on normal conditions) of hydrogen and 77.3 gms. isobutene). The residue is subsequently distilled. After a small amount of first runnings (6 grams boiling up to 107° C./11 mm. Hg) a total of 115 gms. (91% of the theory) of 1-isobutyl-3-methyl-boro-indane (B.P. 109° C./11 mm. Hg) is obtained as a colorless, highly air-sensitive liquid.

EXAMPLE 2

*1-(2-phenylethyl)-boro-indane (from boron tri-(2-phenyl-ethyl))*

A total of 195 grams (0.598 mol) of boron tri-(2-phenyl ethyl) is split within about 10 hours at a pressure of about 25 mm. Hg in a vessel heated at 285–300° C. with the exclusion of air. While the hydrogen evolved is continuously pumped off, 1-(2-phenyl ethyl)-boro-indane distils in addition to styrene and ethyl benzene. Rectification of the distillate results in 119 grams(90% of the theory) of pure 1-(2-phenyl ethyl)-boro-indane boiling at 175° C./11 mm. Hg.

EXAMPLE 3

*1-(2-phenyl propyl)-3-methyl-boro-indane (from boron tri-(2-phenyl propyl))*

90 grams (0.244 mol) of boron tri-2-phenyl propyl are heated to 170–190° C. under a reduced pressure (about 0.1 to 1 mm. Hg). In doing so, hydrogen is split off vigorously and α-methyl styrene is evolved. The distillate contains 59.5 grams (98.3% of theory) of 1-(2-phenyl propyl)-3-methyl-boro-indane (B.P. 126° C./0.5 mm. Hg). By heating with boron triethyl to about 150° C. (in autoclave), the compound furnishes 1-ethyl-3-methyl-boro-indane (B.P. 98° C./11 mm. Hg).

EXAMPLE 4

*1-isobutyl-boro-tetraline (from boron tri-isobutyl and allyl benzene)*

Di-isobutyl-boro-mono-(3-phenyl propyl) obtained at 180° C. from 118 grams (1 mol) of allyl benzene and 182 grams (1 mol) of boron tri-isobutyl is cleaved at 230–250° C. resulting in isobutene (1 mol), hydrogen (1 mol) and 1-isobutyl-boro-tetraline. A total of 171 grams (92% of theory) of a colorless liquid which is sensitive to air is obtained (B.P. 119° C./11 mm. Hg).

EXAMPLE 5

When heating 1 mol boron trihexyl B(C$_6$H$_{13}$)$_3$ and 1 mol 4-phenyl buten-1 (or 4-phenyl butene-2) to 240–250° C., distilling off 2 mols hexene and splitting off 1 mol hydrogen, an almost quantitative yield of 1-hexyl-2-methyl-boro-tetraline (B.P. 105–108° C./0.5 mm. Hg) is obtained by the procedure described in Example 4.

EXAMPLE 6

Styrene in amount of 77 grams (0.738 mol) is added dropwise at 150° C. to 42.5 grams of N-triethyl borazane. In doing so, triethyl amine is set free and distils. Following this, the resulting mixture which has a composition corresponding to the compound (C$_6$H$_5$CH$_2$CH$_2$)$_2$BH is heated to 200–210° C. thereby evolving a total of 8.7 liters of hydrogen within about 2 hours. A substantially quantitative yield of 1-(2-phenyl ethyl)-boro-indane having a boiling point of 175° C./11 mm. Hg is obtained in addition to 35 grams of triethylamine.

EXAMPLE 7

97 grams (0.822 mol) of α-methyl styrene are added dropwise at 140–170° C. to 63 grams (0.548 mol) of N-triethyl borazane, and 63 grams (0.274 mol) of boric acid tributyl ester are added to the mixture. The mixture which has a composition corresponding to the formula $(C_9H_{11})_2BH$ is heated at 190–200° C. In doing so, the amine set free (53 grams) is distilled off and 18.5 liters of hydrogen are evolved within 2–3 hours. There are obtained 105 grams of 1-butoxy-3-methyl-boro-indane boiling at 92–94° C./1 mm. Hg.

EXAMPLE 8

A total of 165 grams of 1-(3-phenyl propyl-boro-tetraline boiling at 120–125° C./10 mm. Hg is obtained from 218 grams of allyl benzene and 106.4 grams of N-triethyl borazane when processed by the procedure described in Example 6 with $(C_9H_{11})_2BH$ being formed as the intermediary compound.

What I claim is:

1. The process for the production of cyclic aromatic boron hydrocarbons, which comprises heating a boron compound having the formula $BR_2R'$, wherein R is selected from the group consisting of hydrogen, alkoxy, saturated aliphatic, saturated cycloaliphatic and aryl-substituted saturated aliphatic hydrocarbon radicals and R' is an aryl-substituted saturated aliphatic radical to a temperature in excess of 150° C., hydrogen and hydrocarbon being split off during said heating, and recovering the cyclic aromatic boron hydrocarbon thus produced.

2. The process of claim 1, wherein the reaction is effected at a temperature of between 180 and 350° C.

3. The process of claim 1, wherein the hydrocarbons which are formed and the hydrogen are removed from the reaction mixture under a reduced pressure.

4. The process according to claim 1, wherein said compound $BR_2R'$ is formed in situ by reaction of a compound $BR_3$ and $BR'_3$ wherein R and R' are as above defined.

5. A process for the production of cyclic aromatic boron hydrocarbons, which comprises reacting a member selected from the group consisting of boron tri-alkyls ($BR_3$) and alkyl diboranes ($B_2H_nR_{6-n}$) wherein R is an alkyl radical and $n$ has a value of from 1 to 5 with an olefin having the formula $Ar-C_nH_{2n-1}$ wherein Ar is an aromatic hydrocarbon radical, and heating the boron compound thus produced to a temperature in excess of 150° C., hydrogen and hydrocarbon being split off during said heating, and recovering the cyclic aromatic boron hydrocarbon thereby formed.

6. A substantially colorless liquid aromatic boron hetero-multicyclic compound

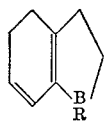

wherein R is selected from the group consisting of hydrogen, alkoxy, saturated aliphatic, saturated cycloaliphatic, and aryl-substituted saturated aliphatic hydrocarbon radicals having 4 carbon atoms in a boro-indane ring.

7. A substantially colorless liquid aromatic boron hetero-multicyclic compound

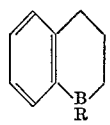

wherein R is selected from the group of hydrogen, alkoxy, saturated aliphatic, saturated cycloaliphatic, and aryl-substituted saturated aliphatic hydrocarbon radicals having 5 carbon atoms in a boro-tetraline ring.

8. 1 - isobutyl-3-methyl-boro-indane having a boiling point of 109° C./11 mm. Hg.

9. 1-(2-phenyl ethyl)-boro-indane having a boiling point of 175° C./11 mm. Hg.

10. 1-(2-phenyl propyl)-3-methyl-boro-indane having a boiling point of 98° C./11 mm. Hg.

11. 1-isobutyl-boro-tetraline having a boiling point of 119° C./11 mm. Hg.

12. 1-hexyl-2-methyl-boro-tetraline having a boiling point of 105–108° C./0.5 mm. Hg.

13. 1 - butoxy-3-methyl-boro-indane having a boiling point of 92–94° C./1 mm. Hg.

14. 1-(3-phenyl-propyl)-boro-tetraline having a boiling point of 120–125° C./10$^{-3}$ mm. Hg.

References Cited by the Examiner

Brown et al: Journ. of Organic Chem., vol. 22, pp. 1137–8 (1957).

Torssell: Acta Chem. Scand., vol. 8, pp. 1779 to 1786 (1954).

Winternitz: Am. Chem. Soc., Abstracts of Papers, 135th meeting 1959, page 19M.

TOBIAS E. LEVOW, *Primary Examiner.*

ROGER L. CAMPBELL, LEON D. ROSDOL, OSCAR R. VERTIZ, *Examiners.*